United States Patent [19]

Frankenthal et al.

[11] Patent Number: 4,740,430
[45] Date of Patent: Apr. 26, 1988

[54] MAGNETO-OPTIC MEMORY

[75] Inventors: Robert P. Frankenthal, Summit; Robert B. vanDover, Berkeley Heights, both of N.J.

[73] Assignee: American Telephone and Telegraph Company, AT&T Bell Laboratories, Murray Hill, N.J.

[21] Appl. No.: 15,900

[22] Filed: Feb. 18, 1987

[51] Int. Cl.[4] ............................................. C03C 27/02
[52] U.S. Cl. .................................... 428/630; 428/641; 428/651; 428/660; 428/661; 428/662; 428/666; 428/678; 428/928
[58] Field of Search .............. 428/622, 627, 632, 633, 428/641, 651, 660, 661, 678, 681, 928, 630, 662, 666; 365/122

[56] References Cited

U.S. PATENT DOCUMENTS 4,124,736 11/1978 Patel et al. .......................... 428/622
4,666,789 5/1987 Gueugnon et al. ................. 428/681

OTHER PUBLICATIONS

*Journal of Applied Physics* 57(1), (Apr. 15, 1985), "Magneto-Optics Recording Technology", Mark H. Kryder, pp. 3913–3918.
*Optical Data Storage*, (Jan. 1983), "Digital Magneto-Optical Recorder", I. Sander et al., DiChen, Editor Proc. SPIE382, p. 240.
*Journal of Applied Physics* 55 (6), (Mar. 15, 1984), "Aging Phenomena in TbFe Thin Films", P. Bernstein and C. Gueugnon, pp. 1760–1762.
*Journal of Applied Physics* 59(1), (Jan. 1, 1986), "Thermal Stability of Magneto-Optic Quadrilayers", T. C. Anthony et al., pp. 213–217.

*Primary Examiner*—L. Dewayne Rutledge
*Assistant Examiner*—George Wyszomierski
*Attorney, Agent, or Firm*—Walter G. Nilsen

[57] ABSTRACT

Certain magnetic alloys are useful for a variety of applications including for magneto-optic memory storage media (optical disks). These magnetic alloys are difficult to protect against composition alteration through such processes as corrosion, oxidation, diffusion, etc. The invention is a multiple-layer structure which protects the magnetic alloys against diffusion as well as corrosion and oxidation without affecting performance of the magnetic alloy in the optical disk. Such magnetic memory storage devices exhibit high bit density and long life. They are erasable and inexpensive and highly advantageous for use in high-bit memory storage devices.

25 Claims, 2 Drawing Sheets

MAGNETO-OPTIC MEMORY

TECHNICAL FIELD

The invention is a magnetic structure involving magnetic material and coatings useful in a variety of applications including magneto-optic memory storage devices.

BACKGROUND OF THE INVENTION

Magnetic materials play an important role in modern technology. They are used in permanent magnets and electromagnets often as part of a motor or other mechanical device. Magnetic materials are also used in various memory devices, transformers, inductances, etc. Various new magnetic materials have advanced this technology considerably and are responsible for the development of new devices useful in modern technology.

Typically, these magnetic materials are made up of such elements as iron, nickel, cobalt, rare-earth metals and alloys of these elements (e.g., FeTb, FeCoTb, etc.).

Particularly attractive in modern technology is the development of magnetic materials for various kinds of memory devices. The development of computers and modern technology has resulted in the need for high density, high capacity memory devices of various characteristics and properties. Various magnetic-type devices such as magnetic computer disks have been used for high density memory units because of low cost, easy fabrication, etc.

Optical disks are also used as memory storage units. Optical disks incorporate low-power lasers to access or read the storage surface. Because laser radiation can be directed onto a very small spot on the storage surface, magnetic storage density is very high, as much as 500 megabytes for an ordinary size disk.

The major disadvantage of conventional optical disks is that they cannot be erased and reprogrammed. Although conventional optical disks are useful in a number of applications, disks with very high bit density that are erasable and reprogrammable are extremely desirable.

A variety of disk structures has been proposed for an erasable, reprogrammable disk. Particularly attractive are disks that work on the magneto-optic principal where magnetic states are used to store the information. In this type of device, the information is contained in magnetic states in the disk, usually in the form of a region of uniform magnetization in a magnetic material with Curie temperature well above room temperature. Reading the disk is done optically generally with a laser using the polar Kerr effect. Changing the direction of magnetization is achieved by heating locally the area of interest and using a magnet or electromagnet to produce the desired magnetization. Such devices have been described in a number of references including a paper entitled "Magneto-optic Recording Technology" by Mark H. Kryder, *Journal of Applied Physics* 57(1), pages 3913–3918 (15 Aug. 1985) and a paper by I. Sander et al. entitled "Digital Magneto-optic Recorder", published in *Optical Data Storage*, Di Chen, Editor, Proc. SPIE 382, page 240 (1983).

The nature of the magnetic medium determines, to a large extent, the characteristics of the optical disks, such as data storage density, writing speed, etc. Amorphous thin films of rare-earth transition-metal alloys have shown great promise as materials for magneto-optical mass storage, giving high storage densities and reasonable writing speeds. It is known that the magnetic and magneto-optical properties of such alloys are very sensitive to composition variations. Such composition variations may be caused by oxidation, corrosion or by chemical reaction or interaction (e.g., diffusion) with other materials interfacing with the magnetic materials.

A variety of materials have been investigated as the magnetic storage medium for magneto-optic disks. In addition to various transition-metal elements and rare-earth elements are a variety of alloys comprising rare-earth elements. Typical elements are iron, nickel and cobalt from the transition-metal elements, terbium and gadolinium from the rare earth metals and other elements such as bismuth and tin. Particularly attractive are alloys of TbFe and various compositions of TbFeCo typically ranging from $Tb_{0.30}Fe_{0.32}Co_{0.38}$ to $Tb_{0.24}Fe_{0.35}Co_{0.41}$.

In order to prevent corrosion of these magnetic films, they are often covered by various non-magnetic films such as $SiO$, $SiO_2$, $Si_3N_4$, etc. Although such non-magnetic protective films improved stability greatly, much greater stability and inertness to external conditions are desirable. Various magnetic materials and protective films for such magnetic materials are discussed in a variety of references including an article by P. Bernstein and C. Gueugnon, Aging Phenomena in TbFe Thin Films, Journal of Applied Physics 55(6), pages 1760–1762 (Mar. 15, 1984) and T. C. Anthony et al., Thermal Stability of Magneto-optic Quadrilayers, Journal of Applied Physics 59(1), pages 213–217 (Jan. 1, 1986).

It is highly desirable to have a magnetic material structure which is inexpensive, highly stable over long periods of time and is suitable for various magnetic devices including memories and optical disk memories.

SUMMARY OF THE INVENTION

The invention is a device comprising magnetic material and a multiple-layer protective coating, one layer being a barrier layer to protect against interdiffusion and reaction with an outer protective film that alter the composition of the magnetic material and another layer (chemically inert layer) made of chemically stable material to protect against chemical alteration such as oxidation and corrosion. The invention is particularly useful for magnetic or magneto-optic memory storage media such as optical disks. Magnetic materials are well known in the art including metals, alloys, compounds, amorphous materials (e.g., splat cooled magnetic glasses or ribbons) etc. Generally, the magnetic materials have Curie temperatures above room temperature, often up to about 1000° C. Many magnetic materials used in optical disks have Curie temperatures between 50° and 600° C., more often in the range of 50° to 250° C. For magnetic storage media, typical magnetic materials are alloys of iron and/or cobalt and rare earth metals, such as terbium and gadolinium, as well as other materials such as bismuth and tin. The barrier layer usually covers at least part of the surface of the magnetic material. The barrier layer is typically made of a material that prevents diffusion through it even in thin layers and that does not react either with the magnetic material or the protective film. Typical barrier layer materials are niobium, tantalum and zirconium with niobium preferred. The chemically inert layer is usually a material (typically metal) that forms a passivating layer on its surface such as aluminum, chromium, nickel or titanium. Often, for a memory device such as an optical disk, magnetic material, diffusion barrier and corrosion barrier are in the form of thin films with thicknesses varying between 10 and several thousand Angstroms, and this structure is mounted on a substrate with perhaps other thin films to provide reflectivity, adhesion, spacing, etc. The entire structure is often covered with a protective coating for ease in handling. These structures provide excellent protection against alteration of the magnetic media over long periods of time and insure stability of the magnetic properties of the magnetic material even when heated by a laser.

DETAILED DESCRIPTION

Figure 1:
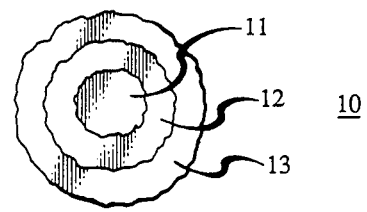
FIG. 1 shows a magnetic structure for a particle with magnetic material surrounded by barrier layer surrounded by chemically inert layer.

The invention is based on the discovery that long term stability for magnetic materials can be achieved by providing not only a chemically inert layer to protect against chemical attack of the magnetic material but also a barrier layer between magnetic material and chemically inert layer to prevent reaction between the chemically inert layer and the magnetic material and to prevent diffusion of material into or out of the magnetic material. The invention is applicable to a large variety of devices employing magnetic or magneto-optic materials. Typical devices are motors, generators, magnetic circuit elements such as transformers, chokes, etc.

Typically, the structure comprises magnetic material, barrier layer and chemically inert layer.

The nature and composition of the barrier layer is particularly important. It should prevent any reaction between the chemically inert layer and the magnetic layer and it should prevent interdiffusion of material either into the magnetic material or out of the magnetic material. In particular, it should prevent diffusion of the material in the chemically inert layer from diffusing into the magnetic material. Also, the material of the barrier layer should not itself interdiffuse with the magnetic material.

Other desirable characteristics of the barrier layer material are as follows. It should have little or no intersolubility with the magnetic material. This can usually be determined from phase diagrams. The barrier material should not react with the chemically inert layer. This is more likely a problem where a dielectric material is used as the chemically inert layer.

Although various types of materials may be used as the barrier layer, a metal or alloy is usually preferred. Such materials are more easily deposited on a surface by such techniques as vacuum evaporation, sputtering, e-beam deposition, etc. Extremely thin layers of metals and alloys are more likely to provide defect-free, uniform coverage of the magnetic material with a minimum of holes and voids. Some preference is given to metals rather than alloys because of ease of deposition and composition stability.

Although the invention is applicable to a large variety of magnetic devices, most interest is centered on magnetic memories of various kinds, including magneto-optic memory storage units.

A variety of magnetic materials is useful in magneto-optic memory storage units. Generally, the magnetic material for magneto-optic disks is an alloy, often including a rare earth metal. The magnetic material should be amorphous to avoid grain-boundary noise.

Magnetic materials should also support submicrometer domains, provide adequate magneto-optic effects for good signal-to-noise ratio for memory "reading", have Curie temperatures to insure stable magnetic domains around room temperature but permit "writing" on laser heating and be stable over long periods of time. An early magnetic materials used for magneto-optic recording was MnBi because of its large Kerr rotation.

The most popular magneto-optic recording materials today are amorphous rare-earth transition-metal alloys, which are deposited by vacuum deposition, sputtering or e-beam deposition. In spite of the fact that no materials have yet been found with a Kerr magneto-optic rotation comparable to that of MnBi, better signal-to-noise ratios are achieved because the amorphous films have a mirror-like surface and produce much less noise than polycrystalline MnBi films. In addition, the deposition procedure for the amorphous alloys is relatively easily achieved in a production environment.

The magnetic properties of the rare-earth transition-metal alloys are governed by antiferromagnetic coupling between the rare-earth and the transition-metal atoms. The magnetic moment per unit volume of the rare-earth atoms is usually different from that of the transition-metal atoms so that a Neel-type ferromagnetic material results. Coercive force is usually reduced on increasing temperature. To write domains into these materials with a focussed laser beam, the temperature of the magnetic material is usually raised above room temperature.

The most popular materials today are alloys containing one or more of the rare-earths Gd, Tb, and Dy in addition to one or more of the transition metals Fe and Co. GdFe and GdCo films typically exhibit very strong temperature dependence of coercivity near the compensation temperature but a rather low coercivity at temperatures away from the compensation point. The smallest domain diameter that can be supported by a magnetic thin film with no field applied is $$d_o = \sigma/M H_c, \quad (1)$$

where $\sigma$ is the domain wall energy, M is the magnetization and $H_c$ is the coercive force. Unless special techniques are used in making GdCo and GdFe films, submicrometer domains are not stable in them because the product $M H_c$ is too small.

One of the earliest materials to have been used that could support submicrometer domains was TbFe. TbFe and GdTbFe alloys remain one of the most popular magneto-optic recording materials. The Kerr rotation angle for these films is about 0.25°. They can be deposited by vacuum evaporation or sputtering.

GdTbCo alloys have adequate intrinsic coercivity, M $H_c$, to support submicrometer domains. The Co-based alloys typically provide slightly higher Kerr magneto-optic rotations ($\theta_k = 0.3°$) than the Fe-based alloys, especially at higher temperatures because their Curie point is higher. In addition, GdCo films typically suffer corrosion less than GdFe films. Slightly higher Kerr rotations have been obtained with TbFeCo alloys. It should be emphasized that improved magnetic materials, which provide more optimum properties, may be found in the future. Thickness of the magnetic layer may vary considerably. Typical range of thickness is 10 to 5000 Angstroms with 25 to 3000 preferred. Optimum thickness often depends on the particular material but generally the magnetic material should be thick enough to insure a continuous film which is pore free. Magnetic and optical properties often limit thickness.

The diffusion barrier may be made by a variety of materials. Metallic elements are often most suitable because they can be deposited in extremely thin layers that are often very effective in preventing diffusion.

Typical metals used for the diffusion barrier are niobium, tantalum, zirconium, titanium, silicon, copper, tungsten and molybdenum. Preferred are niobium, tantalum and titanium with niobium most preferred. Solid solutions of these metals and alloys of these metals may also be useful (for example to obtain an effective barrier with a thinner layer), but for the most part metallic elements are preferred because of ease of deposition and ease in regulating composition and layer structure. Layer thickness for the barrier layer may vary considerably often depending on where in the magnetic disk structure the layer is located. For example, if light from the laser reading the disk must pass through the barrier layer, small layer thickness is at a premium and thicknesses between 10 and 500 Å are usually preferred. Less than 10 Å, the layer is not likely to be continuous (pore-free and minimum defect density) and greater than 500 Å seems unnecessary, wasteful of material and difficult to get light through where that is necessary. The range from 50 to 200 Å is usually preferred.

The chemically inert layer should be chemically stable particularly to exposure to air and atmospheric conditions up to a temperature of at least 200 degrees (preferably 300 degrees or higher). Elevated temperatures are used in the "erase" and "writing" steps for optical memories. In addition, the chemically inert layer should not react or alter the barrier layer either at room temperature or at the elevated temperatures referred to above.

Various materials may be used in the chemically inert layer including metals, alloys, and dielectrics (e.g., glasses, oxides, etc.). Typical dielectrics are $SiO_2$, SiO, silicon nitride, borosilicate glasses, phosphosilicate glass, $Al_2O_3$, $Cr_2O_3$, $TiO_2$, and nickel oxide.

Preferred for the chemically inert layer are metals and alloys with the properties described above. Metals and alloys are preferred because of ease in obtaining thin, pore-free and defect-free layers. Generally, metals or alloys that form passivating layers in air that are stable up to 200 or 300 degrees C are preferred. Typical metals are chromium, aluminum, nickel, titanium and silicon with aluminum and chromium most preferred. Typical alloys are the various alloys of chromium and iron (e.g., the stainless steels) and the various nickel-based alloys (e.g., Inconel, etc.). Layer thickness for the chemically inert layers may vary over large limits. Where light is to pass through the layer (e.g., in the read phase of an optical disk device), small thickness is at a premium. Typical thicknesses are between 10 and 500 Å with 20 to 150 Å preferred. The lower limit is set so as to insure pore-free, defect free layer and sufficient thickness to support an oxide film on the layer. Greater thicknesses than the upper limit make it difficult for light transmission and often is not necessary. Where the chemically inert layer is serving another function, (reflector, dielectric layer, etc.), greater thicknesses (e.g., several thousand Angstroms) are often used.

The invention may be useful for a variety of magnetic structures. For example, the magnetic structure may be a small particle used in large numbers in a motor or other electromagnetic device. FIG. 1 shows such a particle 10 with magnetic material 11, barrier layer 12, and chemically inert layer 13. It should be recognized that the magnetic material may be in a variety of structural forms, including particles, ribbons, wires, layers, etc., and a variety of physical forms including amorphous, glass, single crystal, epitaxial, polycrystal, etc.

Figure 2:
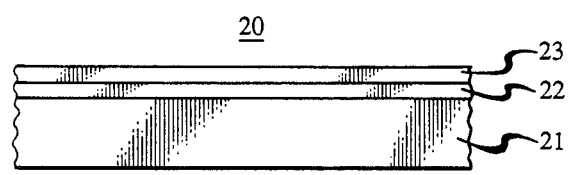
FIG. 2 shows a magnetic structure made up of more or less flat layers of magnetic materials, barrier material and chemically inert material.

In a typical memory disk or plate, the various layers are often in the form of flat layers. A typical structure 20 is shown in FIG. 2. The structure is made up of a film or layer of magnetic material 21, at least partially covered with a barrier layer 22 that in turn is at least partially covered with a chemically inert layer 23. This type structure, with other layers is often used for magnetic disk memories of various kinds including magnetic optical disks.

Figure 3:
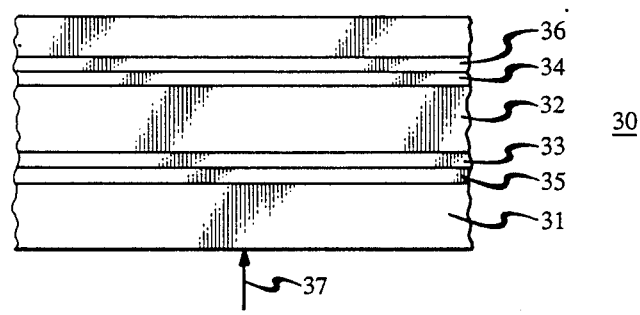
FIG. 3 shows a magnetic structure useful for optical disks where the layers are attached to a substrate.

FIG. 3 shows a structure often useful for erasable optical disk 30. The optical disk is made up of a substrate 31, often made of glass, a layer of magnetic material 32 (e.g., FeTb), surrounded by barrier layer 33 and 34 (e.g., Nb) and chemically inert layers 35 and 36 (e.g., Cr.). A top protective layer 37 is often used to increase ease of handling. This layer is typically made of lacquer, often with thickness in the range of 1–5 mils. Optical access is often through the substrate as indicated by the arrow 37.

Other structures are also used. Generally, these structures are designed to increase the sensitivity of the reading function, often by some optical cancelling effect. For example, a ¼ wave plate might be used to minimize reflection of the unaltered laser beam so that only the rotated beam is reflected out.

Figure 4:
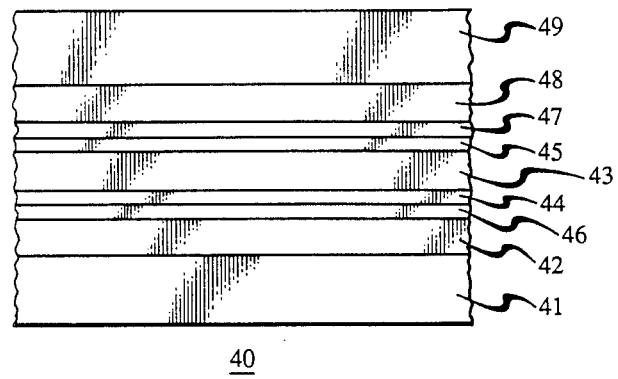
FIG. 4 shows a magnetic structure useful for optical disks in which a reflector and ¼ wave plate are incorporated to enhance the detection system for bit information.

FIG. 4 shows a typical optical disk structure using ¼ wave plate cancellation. The optical disk structure 40 is made up of a substrate 41, a dielectric layer 42 with thickness such that the primary laser beam unaffected by magneto-optic rotation cancels and is minimum intensity on reflection. The magnetic material is also in the form of a layer 43 surrounded by barrier layers 44 and 45 and chemically inert layers 46 and 47. A reflecting layer 48, often made of copper or aluminum, appears on top followed by a protective layer 49 usually made of lacquer. Often, the upper chemically inert layer 47 may also serve as the reflecting layer by using greater thickness. The thickness of the layer of magnetic material is such as to permit partial transmission of the laser beam and reflection at the reflector layer 48 (typically 300–400 Å). The thickness of the barrier layer 44 and chemically inert layer 46 should be as small as possible to permit maximum transmission of light.

Figure 5:
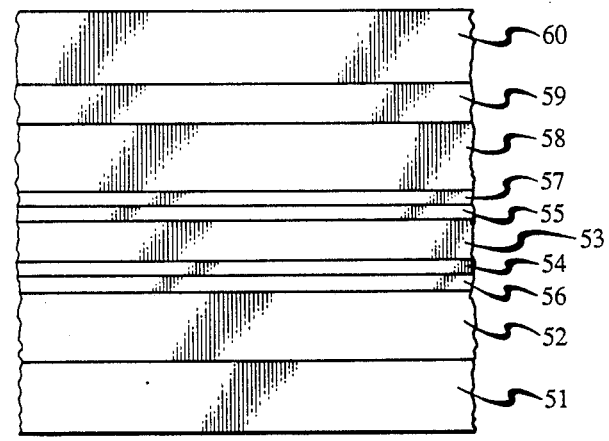
FIG. 5 shows another magnetic structure useful for optical disks that yields enhanced optical intensity in the magnetic material layer by judicious use of dielectric layers and reflector layer.

FIG. 5 shows another structure 50 for an optical disk. The structure is arranged so as to maximize intensity of the laser beam inside the magnetic material usually by constructive interference effects. The structure 50 is made up of substrate 51 and dielectric layer 52 and a rather thin layer of magnetic material 53 (typically about 150 Å) surrounded by barrier layers 54 and 55 and chemically inert layers 56 and 57. Above these layers is a dielectric layer 58 with thickness such that there is constructive interference of the laser beam at the magnetic material layer 53. On top of this layer is a reflecting layer 59 typically made of aluminum or copper and a protective layer 60 generally made of lacquer.

What is claimed is:

1. A device comprising a magnetic structure, said magnetic structure comprising:
   a. magnetic material with Curie temperature above room temperature;
   b. a first region comprising barrier material contacting at least a portion of the magnetic material;
   c. a second region comprising chemically inert material contacting at least a portion of the first region in which said chemically inert material comprises at least one metallic substance selected from the group consisting of metallic element and metallic alloy, said metallic substance being substantially passive to atmospheric conditions;
   d. said barrier material having the property of preventing interdiffusion into or out of the magnetic material and not reacting with the magnetic material or chemically inert material; and
   e. said chemically inert material being chemically inert to the barrier material.

2. The device of claim 1 in which the magnetic material comprises a substance selected from the group consisting of iron, cobalt, rare earth metal, bismuth and tin.

3. The device of claim 2 in which the substance is an alloy.

4. The device of claim 3 in which the alloy comprises at least one element selected from the group consisting of iron, cobalt, terbium, dysprosium, gadolinium, bismuth and tin.

5. The device of claim 4 in which the magnetic material comprises alloy selected from the group consisting of GdFe, GdCo, GdFeCo, TbFe, TbCo, GdTbFe, GdTbCo and TbFeCo.

6. The device of claim 1 in which the barrier material comprises at least one substance selected from the group consisting of niobium, tantalum, zirconium, titanium, silicon, copper, tungsten and molybdenum.

7. The device of claim 6 in which the barrier material comprises at least one substance selected from the group consisting of niobium, tantalum and zirconium.

8. The device of claim 7 in which the barrier material consists essentially of niobium.

9. The device of claim 1 in which the metallic substance comprises metal selected from the group consisting of chromium, aluminum, nickel, titanium and silicon.

10. The device of claim 9 in which the metallic substance comprises at least one metallic element selected from the group consisting of chromium and aluminum.

11. The device of claim 10 in which the metallic substance comprises aluminum.

12. The device of claim 10 in which the metallic substance comprises chromium.

13. The device of claim 1 in which the barrier material comprises niobium and the chemically inert material comprises chromium.

14. The device of claim 1 in which the magnetic structure comprises
   a. a substantially flat layer of magnetic material;
   b. a first region in the form of a substantially flat layer substantially covering the surface of the magnetic material; and
   c. a second region in the form of a substantially flat layer substantially covering the first region.

15. The device of claim 14 in which the thickness of the layer of magnetic material is between 10 and 500 Å.

16. The device of claim 15 in which the thickness of the layer of magnetic material is between 25 and 3000 Å.

17. The device of claim 14 in which the first region has a thickness between 10 and 500 Å.

18. The device of claim 17 in which the thickness of the first region is between 50 and 200 Å.

19. The device of claim 14 in which the thickness of the second region is between 10 and 500 Å.

20. The device of claim 19 in which the thickness of the second region is between 20 and 150 Å.

21. The device of claim 14 in which the magnetic structure is mounted on a substrate.

22. The device of claim 21 in which the substrate comprises glass.

23. The device of claim 21 in which the magnetic structure is covered by a protective layer comprising lacquer.

24. The magnetic structure of claim 14 in which part of the second region contacts a dielectric material and part of the second region contacts a reflecting layer.

25. The magnetic structure of claim 14 in which substantially all of the second region contacts a dielectric region in the form of layers and a reflecting layer covers part of the dielectric layer.

* * * * *

UNITED STATES PATENT AND TRADEMARK OFFICE
CERTIFICATE OF CORRECTION

PATENT NO. : 4,740,430

DATED : April 26, 1988

INVENTOR(S) : Robert P. Frankenthal and Robert V. vanDover

It is certified that error appears in the above-identified patent and that said Letters Patent is hereby corrected as shown below:

Column 2, line 27 - "55" should be italicized

Column 2, line 30 - "59" should be italicized

Claim 15 - "500Å" should be --5000Å--

Signed and Sealed this

Twenty-sixth Day of June, 1990

Attest:

HARRY F. MANBECK, JR.

*Attesting Officer*     *Commissioner of Patents and Trademarks*